March 2, 1937. J. P. TRICKEY ET AL 2,072,536

CLOSURE

Filed Sept. 7, 1932

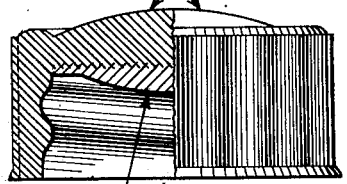

Fig. 1.
Body portion of Molded composition
Plasticized Vinyl Resin Internal Liner Integral with Body portion.

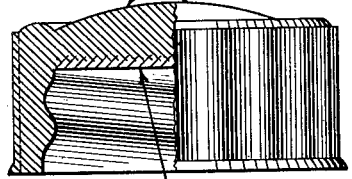

Fig. 3.
Body portion of Molded composition
Plasticized Vinyl Resin Internal Liner Integral with Body Portion

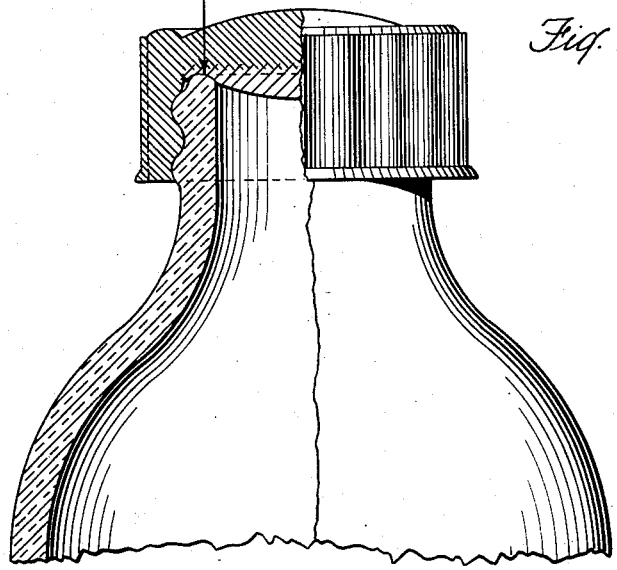

Plasticized Liner Deformed By Bottle Top Forming a Seal

Fig. 2.

INVENTORS
John P. Trickey
John R. Price
BY
Charles C. Scheffler
ATTORNEY

Patented Mar. 2, 1937

2,072,536

UNITED STATES PATENT OFFICE 2,072,536

CLOSURE

John P. Trickey and John R. Price, Dayton, Ohio, assignors, by mesne assignments, to Union Carbide and Carbon Corporation, a corporation of New York Application September 7, 1932, Serial No. 631,956

11 Claims. (Cl. 215—38)

Closures and caps adapted to be used with glass bottles and jars, containers formed from metal, vitreous materials, and the like, have, of recent years, been made from various materials, such as phenol-formaldehyde, urea-formaldehyde, and other moldable resins, cellulose acetate, and the like. Similar types of closures previously were commonly made from metals, usually tin plate. Almost invariably closures of this class require a lining material or sealing element which is sufficiently soft to permit sealing when pressure is applied and the closure secured to the container. Liners and sealing elements have been made of composition cork, cellulosic materials variously treated, rubber compositions, and soft metals and alloys.

Since many types of materials are packaged in containers with which the above-described closures may be used, a variety of liners is required, the type depending upon the contents of the container to be contacted therewith. Closures of this type which have a separable sealing element possess a disadvantage in that it is very difficult to hold the liners in place when the closure is being handled by a capping machine or when the closure is removed from the container. Various means of holding the liner in the closure have been proposed but none of the proposals have been practically or economically satisfactory. Also a separate operation is required to place the liner in the closure before assembling the closure and container.

The principal object of our invention is to mitigate the above-named objections and to provide a novel closure which is unitary and which has an integral sealing element, and which may be readily formed in the manner by which molded closures are made.

We have discovered that the objects of the invention may be attained and that a novel improved closure which requires no separate sealing element may be produced by the use of vinyl resin compositions. The new closures are illustrated by the accompanying drawing, in which Fig. 1 and Fig. 3 are typical improved closures embodying two modifications of the invention. Fig. 2 shows the closure of Fig. 1 applied to a container.

Vinyl resins suitable for use in our new closures may be formed from vinyl esters by known polymerization processes; polymerization products of inorganic vinyl esters, such as the vinyl halides, or those of organic vinyl esters, for example, vinyl esters of aliphatic acids, may be used. Vinyl resins resulting from the conjoint polymerization (by which is meant polymerization of a plurality of compounds while in mutual contact) are preferred. For example, vinyl resins having desirable properties may be prepared by the conjoint polymerization of a vinyl halide and a vinyl ester of an aliphatic acid. The products of the conjoint polymerization of vinyl chloride and vinyl acetate in proportions ranging from about 50% to 90% by weight of the chloride are particularly desirable. These preferred vinyl resins may be prepared by causing a mixture of vinyl chloride and vinyl acetate containing, for example, 80% by weight of vinyl chloride, to be polymerized in the presence of a suitable liquid medium, such as the aliphatic alcohols, ketones, and paraffin hydrocarbons, and in the presence of a suitable polymerizing catalyst, such as dibenzol peroxide at a temperature below about 60° C. Vinyl resins and their production are not a part of this invention.

The above-described preferred vinyl resins are substantially water-white and transparent, and they are chemically and electrically inert. These resins are resistant to acids, alkalies, and salts, and are not affected by and do not affect materials commonly packaged in bottles and like containers. In particular, vinyl resins are odorless, tasteless, and will not impart odor or taste to foodstuffs and the like with which they may be contacted. They are, however, softened by certain solvents, such as aliphatic esters, aromatic hydrocarbons, and ketones, and are not suitable for use where such solvents are encountered. Vinyl resins are miscible with many modifying materials, such as waxes, gums, plasticizers, and the like, and in addition the properties of the preferred vinyl resins are retained to a large extent when these resins are modified by the addition of the above materials. Because of this property vinyl resins can be modified to meet specific requirements without materially altering the advantageous properties of the resins. In particular, vinyl resins can be plasticized to a considerable extent without sacrificing their toughness and strength, and vinyl resins so plasticized will retain their plasticity at low temperatures, i. e., —10° C.

In practicing our invention we compound about 15% to 20% of plasticizer with a vinyl resin composition and preform this material into the proper shape and size according to the closure with which it is to coact. This preform is then inserted in a mold and over it is placed a preform of a moldable resin composition sufficiently rigid to form the body portion of the closure. The molding operation is then performed and the closure is shaped to form an assembly having a rigid exterior and body portion with a plasticized vinyl resin composition on the inside thereof to serve as a sealing element. We have found that various moldable resin compositions such as those containing phenol-formaldehyde resins, urea or thiourea-formaldehyde resins, cellulose acetate, or various vinyl resin compositions may be used for molding closures having the plasticized vinyl resin composition as the interior of the cap. The closure may be provided with threads or other means by which it is secured to the container.

It is well known that the dimensions of commercially produced bottles, jars, and other containers vary in size to an appreciable extent. We have found that these variations in dimensions in the necks of bottles or jars with which the closure is to coact may cause some difficulty in obtaining a proper seal. This is overcome in our new closure by the use of a convex dome-shaped or cone-shaped surface on the inside of the closure formed by the plasticized vinyl resin composition. In such case the maximum diameter of the dome or convex portion must be slightly in excess of the diameter of the opening which it is to seal. The particular shape of the sealing portion of the closure is not essential since it is recognized that the design of the closure is largely dependent upon the shape and size of the opening to be sealed.

The vinyl resin composition may contain other materials such as fillers or waxes. We prefer to use a composition containing approximately 20 parts by weight of a plasticizer which may be tricresyl phosphate, dibutyl phthalate, phthalic acid esters of other aliphatic alcohols including the alkoxy alcohols, or any plasticizing material which is compatible with the vinyl resin composition. It is necessary only to use sufficient plasticizer to impart such plasticity to the vinyl resin composition as will permit the composition to be deformed by a coacting portion of a container to form a seal. Our preferred composition also contains aboue 1 part by weight of a wax, such as carnauba wax, beeswax, or paraffin, and about 19 parts by weight of a filler, such as wood flour, cotton flock, alpha cellulose pulp, or an inorganic filler or pigment, the balance of the composition being the preferred vinyl resin. The composition may be prepared for use by mixing these materials which are then thoroughly compounded on hot differential rolls and ground to a powder. Vinyl resins are almost permanently thermoplastic and are economical to use since waste material and defective parts may be reused without loss.

The following examples will serve to illustrate the invention:

I. A vinyl resin was prepared by the conjoint polymerization of vinyl chloride and vinyl acetate in the proportions of about 80% by weight of vinyl chloride. A molding composition containing this resin was made up as follows:

|  | Per cent by weight |
|---|---|
| Vinyl resin | 55 |
| Alpha pulp | 40 |
| Mineral pigment | 3 |
| Carnauba wax | 1 |
| Alkaline calcium stearate | 1 |

This composition was then preformed into the shape of the body portion of a bottle closure.

Another vinyl resin composition was prepared as follows:

|  | Per cent by weight |
|---|---|
| Vinyl resin | 78 |
| Dibutyl phthalate | 20 |
| Carnauba wax | 1 |
| Alkaline calcium stearate | 1 |

This latter composition was prepared as a disc to be molded to form the sealing element or liner of the closure.

The mold was constructed so that the forces were on the bottom section. Preforms of the second or plasticized composition were placed on each of the forces of the mold and preforms of the body portion were placed over these. The mold, heated by steam at a pressure of about 45 to 50 pounds per square inch, was closed, and as soon as it was closed, the steam was turned off and cooling water admitted to cool the mold. When the mold was cooled to about 100° F. it was opened and the finished closures having rigid body portions, and integral sealing elements, were removed.

II. Closures were made as described in Example I with the exception that preforms of a molding powder containing a phenol-formaldehyde resin were used for the body portion. The sealing elements were preformed from the plasticized vinyl resin composition of the previous example. The molding operation was carried out as in Example I except that the steam was allowed to heat the mold for a period long enough to cure the phenol-formaldehyde resin before the mold was cooled and opened.

III. Closures were molded as described in Example II using preforms of a molding composition containing a urea-formaldehyde resin for the body portions of the closure and using preforms of the plasticized vinyl resin composition for the sealing elements or liners.

IV. Closures were molded exactly as described in Example I using a cellulose acetate molding composition for the body portion and the plasticized vinyl resin composition for the sealing element.

V. In certain instances it is desirable to form the entire closure of a somewhat flexible material instead of making it with a rigid body portion and flexible sealing element as above described. This may be done by molding the closure and sealing element of the same material an example of which is as follows:

|  | Per cent by weight |
|---|---|
| Vinyl resin | 55 |
| Alpha pulp | 30 |
| Dibutyl phthalate | 10 |
| Mineral pigment | 3 |
| Carnauba wax | 1 |
| Alkaline calcium stearate | 1 |

Preforms of this composition were made for both the liners and body portions of closures and molded as described in Example I. The resulting closures were unitary and possessed an integral sealing element. The entire closure exhibited a certain degree of resilience and flexibility making it desirable in certain applications, such as where irregularities in the container with which the closure is to coact require flexibility in the closure.

In the composition of this example it is apparent that the flexibility imparted in the closure and liner may be varied according to the amount of plasticizer used.

The vinyl resin compositions may be varied and the amounts of additional materials to be used therewith may depart from the ranges given dependent upon the conditions to be met.

We claim:

1. A unitary molded closure for containers comprising a body portion formed of a molded composition provided with an internal liner or sealing element formed integrally therewith and which is of sufficient plasticity to be deformed by a coacting portion of a container to form a seal, said liner or element being a resilient, plasticized composition essentially composed of a vinyl resin substantially identical with a resin resulting from the conjoint polymerization of a vinyl halide with a vinyl ester of an aliphatic acid containing a wax.

2. A unitary molded closure for containers comprising a body portion formed of a molded vinyl resin composition provided with an internal liner or sealing element formed integrally therewith and which is of sufficient plasticity to be deformed by a coacting portion of a container to form a seal, said liner or element being a resilient vinyl resin composition containing a plasticizer for said vinyl resin and a wax.

3. A unitary molded closure for containers comprising a body portion formed of a molded composition provided with an internal liner or sealing element formed integrally therewith and which is of sufficient plasticity to be deformed by a coacting portion of a container to form a seal, said liner or element being a resilient vinyl resin composition containing a plasticizer for said vinyl resin and a wax.

4. A unitary molded closure for containers comprising a body portion formed of a molded composition provided with an internal liner or sealing element formed integrally therewith and which is of sufficient plasticity to be deformed by a coacting portion of a container to form a seal, said liner or element being essentially composed of a resilient, plastic composition containing about 80 parts of a vinyl resin substantially identical with a resin resulting from the conjoint polymerization of vinyl chloride with vinyl acetate, and about 20 parts of a plasticizer for said vinyl resin.

5. Method of making closures having a body portion and an internal liner or sealing element integral with said body portion, which comprises preforming a moldable composition to form a closure body portion, preforming a liner or sealing element from a vinyl resin composition of sufficient plasticity when molded to permit it to be deformed by a coacting portion of a container to form a seal, placing the liner preform within the preformed body portion, molding the whole under heat and pressure, cooling the molded assembly, and removing the molded unitary closure.

6. Method of making closures having a body portion and an internal liner or sealing element, which comprises preforming a vinyl resin composition to form a closure body portion; preforming a liner or sealing element from a vinyl resin composition of different and greater plasticity than that of said body portion, and which when molded will permit said liner or element to be deformed by a coacting portion of a container to form a seal; placing the liner preform within the preformed body portion; subjecting the whole to heat and pressure within a mold; cooling the molded assembly; and removing the molded unitary closure from said mold; the vinyl resin in the compositions of both the body portion and liner or sealing element of said closure being substantially identical with a resin resulting from the conjoint polymerization of a vinyl halide and a vinyl ester of an aliphatic acid.

7. A unitary composite molded closure for containers, comprising a non-yieldable body portion formed of a molded vinyl resin composition and provided with an integral yieldable internal liner and sealing portion coextensive with its inner top surface and which is of sufficient plasticity to be deformed by a coacting portion of a container to form a seal, said yieldable liner portion being a resilient, plastic vinyl resin composition.

8. A unitary composite molded closure for containers, comprising a non-yieldable body portion formed of a molded vinyl resin composition and provided with an integral yieldable internal liner and sealing portion coextensive with its inner top surface and having an inverted dome shape, the said dome sealing portion being of sufficient plasticity to be deformed by a coacting portion of a container to form a seal, said yieldable liner portion being a resilient, plastic vinyl resin composition.

9. A unitary molded closure for containers comprising a body portion formed of a molded composition provided with an internal liner or sealing element formed integrally therewith and which is of sufficient plasticity to be deformed by a coacting portion of a container to form a seal, said liner or element comprising a resilient, plastic, vinyl resin composition essentially composed of a vinyl resin substantially identical with a resin resulting from the conjoint polymerization of vinyl chloride with a vinyl ester of an aliphatic acid together with a wax.

10. A unitary molded closure for containers comprising a body portion formed of a molded composition provided with an internal liner or sealing element formed integrally therewith and which is of sufficient plasticity to be deformed by a coacting portion of a container to form a seal, said liner or element comprising a resilient, plastic, vinyl resin composition essentially composed of a vinyl resin together with a wax.

11. A unitary molded closure for containers comprising a body portion formed of a molded composition provided with an internal liner or sealing element formed integrally therewith and which is sufficiently plastic to be deformed by a coacting portion of a container to form a seal, said liner or element comprising essentially a reinforcing fibrous material combined with a resilient, plastic vinyl resin composition essentially composed of a vinyl resin together with a wax.

JOHN P. TRICKEY.
JOHN R. PRICE.

CERTIFICATE OF CORRECTION.

Patent No. 2,072,536.                                                March 2, 1937.

JOHN P. TRICKEY, ET AL.

It is hereby certified that error appears in the printed specification of the above numbered patent requiring correction as follows: Page 1, second column, line 18, for the word "dibenzol" read dibenzoyl; page 2, first column, line 46, for "aboue" read about; and that the said Letters Patent should be read with these corrections therein that the same may conform to the record of the case in the Patent Office.

Signed and sealed this 30th day of March, A. D. 1937.

(Seal)                                                              Henry Van Arsdale
Acting Commissioner of Patents.